United States Patent
Cherney et al.

(10) Patent No.: US 12,391,173 B2
(45) Date of Patent: Aug. 19, 2025

(54) PEDESTRIAN WARNING WITH LIGHT SPECTRUM THAT DOES NOT AFFECT CAMERA BASED OBJECT DETECTION AT NIGHT

(71) Applicant: Deere & Company, Moline, IL (US)

(72) Inventors: Mark J. Cherney, Bettendorf, IA (US); Zachary T. Bonefas, Grimes, IA (US)

(73) Assignee: Deere & Company, Moline, IL (US)

( * ) Notice: Subject to any disclaimer, the term of this patent is extended or adjusted under 35 U.S.C. 154(b) by 5 days.

(21) Appl. No.: 18/520,528

(22) Filed: Nov. 27, 2023

(65) Prior Publication Data

US 2025/0170953 A1    May 29, 2025

(51) Int. Cl.
*B60Q 1/50* (2006.01)
*B60Q 1/52* (2006.01)
*B60Q 5/00* (2006.01)
*E02F 9/26* (2006.01)
*G06V 20/58* (2022.01)

(52) U.S. Cl.
CPC .............. *B60Q 1/525* (2013.01); *B60Q 1/52* (2013.01); *B60Q 5/006* (2013.01); *E02F 9/261* (2013.01); *G06V 20/58* (2022.01); *B60Q 2800/20* (2022.05); *G06V 2201/07* (2022.01)

(58) Field of Classification Search
None
See application file for complete search history.

(56) References Cited

U.S. PATENT DOCUMENTS 11,501,619 B2    11/2022   Cherney et al.
11,532,221 B1 *  12/2022   Rogan ................... G08B 7/06
11,972,669 B2 *  4/2024    Rogan ............ G08B 13/19663
11,993,204 B2 *  5/2024    Smith, Jr. ............... B60Q 1/525
12,083,955 B2 *  9/2024    Thakur .................. B60Q 1/535
(Continued)

FOREIGN PATENT DOCUMENTS

DE    102020213360 A1    5/2021
EP    2919150 A1         9/2015
(Continued)

OTHER PUBLICATIONS

German Search Report issued in application No. 102024130745.5 dated Jun. 16, 2025, 08 pages.

*Primary Examiner* — Fekadeselassie Girma
(74) *Attorney, Agent, or Firm* — Taft Stettinius & Hollister LLP; Stephen F. Rost

(57) ABSTRACT

A pedestrian warning system for a work vehicle at a worksite that includes a sensor system that captures images of an identified target located at the worksite. An electronic data processor is communicatively coupled to the sensor system, and the electronic data processor determines whether the identified target from the captured image is an intended target based on one or more identifying characteristics associated with the identified target. When the intended target is identified, an alert directed to the intended target is generated that includes operation of one or more lights mounted on the work vehicle. The one or more lights operate in a light spectrum range that is not visible by the sensor system. The sensor system may include an optical filter to block light that corresponds to the light spectrum range of the one or more lights. The lights may operate in a strobing function.

20 Claims, 6 Drawing Sheets

(56) References Cited

U.S. PATENT DOCUMENTS

| | | | |
|---|---|---|---|
| 2015/0343943 A1* | 12/2015 | Thoday | B60Q 5/006 340/435 |
| 2018/0029706 A1* | 2/2018 | Baruch | B64U 10/13 |
| 2018/0174460 A1* | 6/2018 | Jung | G08G 1/16 |
| 2019/0258878 A1* | 8/2019 | Koivisto | G06V 10/774 |
| 2020/0114813 A1* | 4/2020 | Lujan | B60Q 1/0035 |
| 2020/0391760 A1* | 12/2020 | Reschke | B60W 50/14 |
| 2022/0005210 A1* | 1/2022 | Raveendran | B60H 1/00742 |
| 2022/0012988 A1* | 1/2022 | Avadhanam | G08B 21/22 |
| 2022/0055531 A1* | 2/2022 | Sugimoto | G06V 10/145 |
| 2024/0161604 A1* | 5/2024 | Ko | G08G 1/052 |

FOREIGN PATENT DOCUMENTS

| | | | | |
|---|---|---|---|---|
| JP | 2023516410 A | * | 4/2023 | H04N 25/131 |
| TW | M629896 U | * | 7/2022 | |

* cited by examiner

PEDESTRIAN WARNING WITH LIGHT SPECTRUM THAT DOES NOT AFFECT CAMERA BASED OBJECT DETECTION AT NIGHT

FIELD OF THE DISCLOSURE

The present disclosure relates generally to a pedestrian warning system, and, more particularly, to a warning system and method for alerting a pedestrian near a vehicle which does not affect camera based object detection of any sensors on the vehicle.

BACKGROUND OF THE DISCLOSURE

In industrial applications, worksite safety procedures are important to ensure the safety of pedestrians, operators, workmen, and other personnel located in the worksite. Generally, for safety purposes, when pedestrians are located in a worksite, alarms on the work vehicle are triggered to alert an operator that non-authorized persons or pedestrians are in the work zone and may be hazardous. These alarms are intended to alert the operator who must then take action to avoid the pedestrian or remove the pedestrian from the work zone. These steps that the operator must take reduce the productivity of the operator and the overall work that is being done in the work zone since the operator must stop work to take action.

To address such concerns, some conventional approaches employ the use of strobe lights to flash at the non-authorized persons or pedestrians that are in the work zone. Other conventional approaches include audible alarms to alert the non-authorized persons that are in the work zone. Drawbacks to such approaches include ineffective notification to the pedestrians as many pedestrians simply ignore the strobe light and take no action to leave the work zone. These pedestrians have become de-sensitized to the back-up alarms or similar audio alarms. An additional drawback is during night when various image sensors on the work vehicle are used to detect objects or view the work zone itself, the strobe lights interfere with the imaging being performed by these image sensors.

As such, there is a need in the art for an improved pedestrian warning system that provides increased visibility and alerts to the pedestrian but does not interfere with camera or other image based object detection at night.

SUMMARY

According to one embodiment of the present disclosure, a pedestrian warning system for a work vehicle at a worksite, the pedestrian warning system comprising: a sensor system configured to capture images of an identified target located at the worksite, the sensor system operably coupled to the work vehicle; an electronic data processor communicatively coupled to the sensor system, the electronic data processor comprising a non-transitory computer readable storage medium having machine readable instructions that, when executed by the electronic data processor, cause the electronic data processor to: determine whether the identified target from the captured image is an intended target based on one or more identifying characteristics associated with the identified target; wherein when the intended target is identified, generate an alert directed to the intended target that includes the electronic data processor is further configured to generate a control signal to operate one or more lights mounted on the work vehicle, wherein the one or more lights are configured to operate in one or more light spectrum ranges that is not visible by the sensor system.

In one example, the sensor system comprises a plurality of imaging devices operably coupled to the work vehicle, wherein the plurality of imaging devices are configured to capture monocular or stereographic images or videos of identified targets located at the worksite.

In one example, the sensor system comprises one or more filters that block light from the light spectrum range that the one or more lights are configured to operate in.

In one example, the one or more filters block light at wavelengths greater than about 650 nm, and the one or more lights operate at wavelengths greater than about 650 nm.

In one example, the one or more filters block light at wavelengths greater than about 600 nm, and the one or more lights operate at wavelengths greater than about 600 nm.

In one example, the one or more filters block light at wavelengths greater than about 600 nm and less than about 425 nm, and the one or more lights operate at wavelengths greater than about 600 nm and less than about 425 nm.

In one example, the one or more filters block light at wavelengths greater than about 650 nm and block light between approximately 550 nm and 575 nm, and the one or more lights operate at wavelengths greater than about 650 nm and block light between approximately 550 nm and 575 nm.

In one example, the electronic data processor is further configured to generate a control signal to operate the one or more lights in an intermittent operation towards the intended target.

In one example, the electronic data processor is further configured to generate a control signal to operate an audible alert unit towards the intended target.

In one example, wherein the sensor system comprises one or more of a thermal imager, a near infrared imaging device, a short waved infrared device, a light detection and ranging device, a radar device, an ultrasonic device, and/or a scanner operably coupled to the work vehicle.

In one example, wherein the one or more identifying characteristics for the identified target being a person include apparel, wearable devices, and/or facial recognition features stored in a database accessible by the electronic data processor.

According to another embodiment of the present disclosure, a method for warning an intended target on a worksite having a work vehicle thereon, the method comprising: capturing, via a sensor system, one or more images of an identified target located at the worksite; determining, via an electronic data processor communicatively coupled to the sensor system, the electronic data processor comprising a non-transitory computer readable storage medium having machine readable instructions, whether the identified target from the captured image is an intended target based on one or more identifying characteristics associated with the identified target; and wherein when the intended target is identified, generating an alert directed to the intended target that includes the electronic data processor operating one or more lights mounted on the work vehicle in one or more light spectrum ranges that is not visible by the sensor system.

In one example of this embodiment, the capturing images of persons comprises capturing monocular or stereographic images or videos of persons by a plurality of imaging devices.

In one example of this embodiment, the generating an alert comprises activating a strobe light on the work vehicle or triggering a sound file towards the identified target to notify the identified target is located on the worksite.

In one example of this embodiment, the sensor system includes one or more filters that block light from the light spectrum range that the one or more lights are configured to operate in.

In one example of this embodiment, the one or more filters block light at wavelengths greater than about 650 nm, and the one or more lights operate at wavelengths greater than about nm.

In one example of this embodiment, the one or more filters block light at wavelengths greater than about 600 nm, and the one or more lights operate at wavelengths greater than about 600 nm.

In one example of this embodiment, the one or more filters block light at wavelengths greater than about 600 nm and less than about 425 nm, and the one or more lights operate at wavelengths greater than about 600 nm and less than about 425 nm.

In one example of this embodiment, the one or more filters block light at wavelengths greater than about 650 nm and block light between approximately 550 nm and 575 nm, and the one or more lights operate at wavelengths greater than about 650 nm and block light between 9 approximately 550 nm and 575 nm.

In one example of this embodiment, further comprising: generating an audible alert, via an audible alert unit, towards the intended target.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
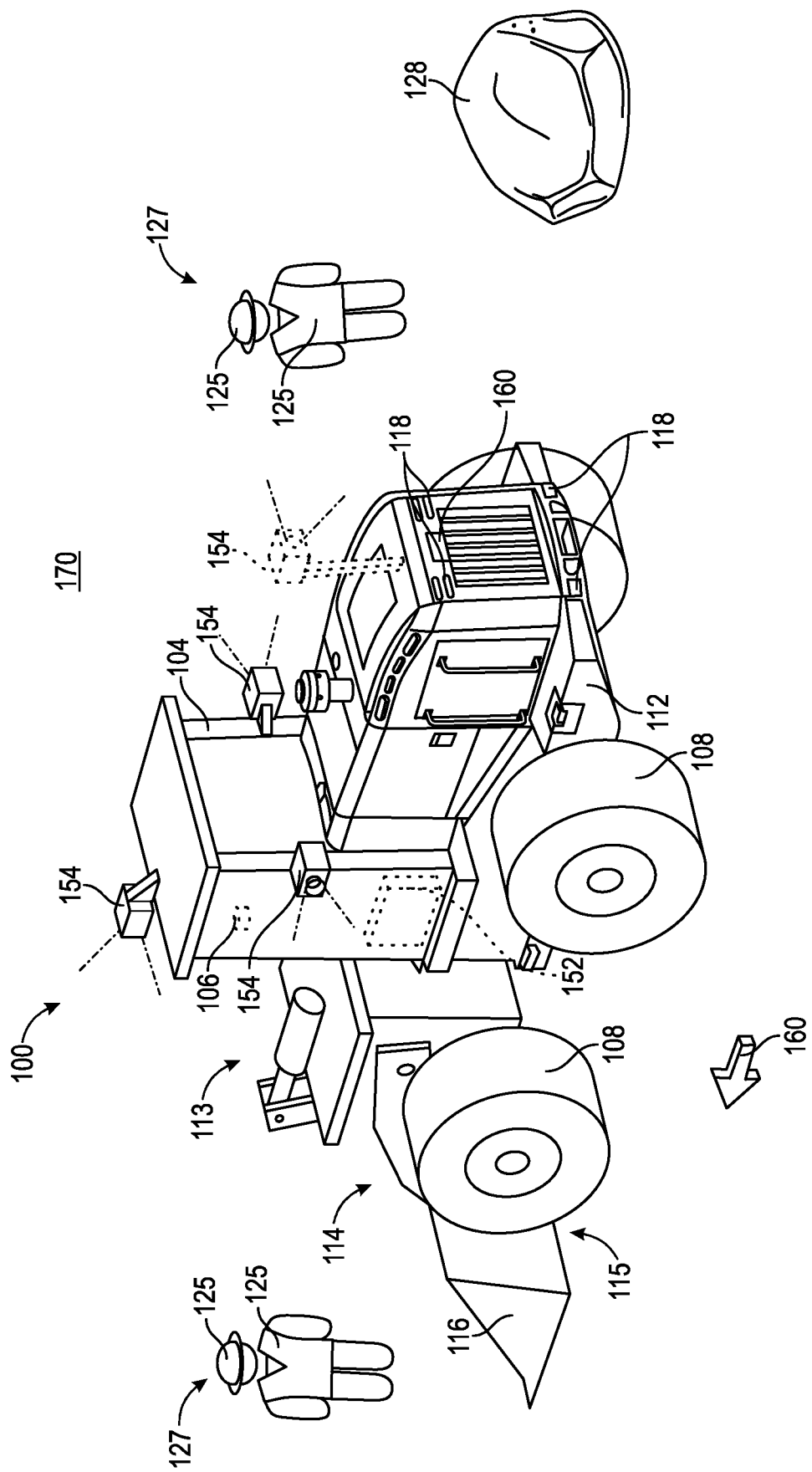
FIG. 1 is an illustration of a work vehicle including a pedestrian warning system according to an embodiment.
Figure 2:
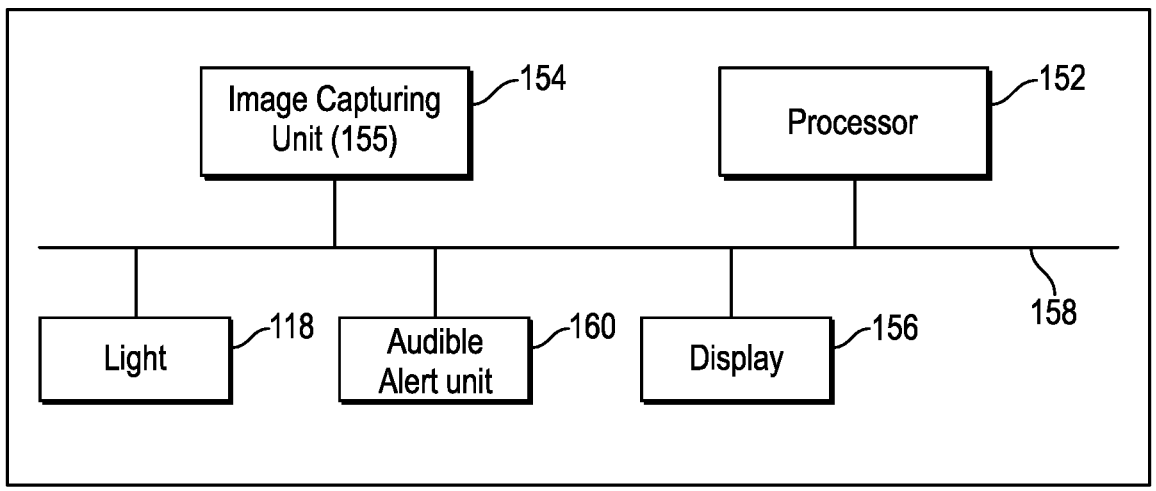
FIG. 2 is a block diagram of the pedestrian warning system according to an embodiment.

Referring to FIGS. 1 and 2, a work vehicle 100 having a pedestrian warning system 150 is shown according to one embodiment. The pedestrian warning system 150 monitors the activity of persons located within a worksite 170. Although the work vehicle 100 is shown as including a construction vehicle (e.g., a loader) in FIG. 1, it should be noted that, in other embodiments, the work vehicle 100 can vary according to application and/or specification requirements. For example, in other embodiments, the work vehicle 100 can include forestry, agricultural, or turf vehicles, with embodiments discussed herein being merely for exemplary purposes to aid in an understanding of the present disclosure.

The work vehicle 100 can comprise a frame 112 and an operator cab 104 supported by wheels 108. A boom assembly 114 can be coupled to the frame 112 and can extend in length between a proximal end 113 and a distal end 115. An implement 116 can be coupled to the boom assembly 114 at its distal end 115 and can comprise a conventional loader bucket as shown. It should be noted, however, that FIG. 1 is but one embodiment and, in other embodiments, the implement 116 may include a ripper, hammer, or fork, for example. One or more lights 118 can be attached to the work vehicle 100 and in particular the one or more lights 118 may be mounted on the frame 112. The one or more lights 118 are configured to operate in one or more light spectrum ranges that does not interfere or interrupt operation of a sensor system 154 as described below. The one or more lights 118 may be mounted on other locations of the work vehicle 100. An audible alert unit 160 can be attached to the work vehicle 100 and in particular the audible alert unit 160 may be mounted on the frame 112.

As illustrated in FIG. 2, the pedestrian warning system 150 can comprise a sensor system 154 communicatively coupled to an electronic data processor 152, a user interface 156 via a communication bus 158, the one or more lights 118, and the audible alert unit 160. In some embodiments, the sensor system 154 can comprise a plurality of imaging devices 155 mounted to a frame of the work vehicle 100 in various locations to capture peripheral imaging data of the worksite 170 in which the work vehicle 100 is operating in. For example, the imaging device 155 can be mounted to a front portion of the work vehicle 100 to capture images of surroundings and persons 125 arranged forward or to the side of the work vehicle 100. The imaging device 155 can have a wide field of view that spans approximately 90 to 180 degrees along a center axis of the device or a supporting structure attached thereto within a defined range. In other embodiments, the imaging device 155 may be optionally mounted to a rear of the work vehicle 100 to capture images of persons or other objects arranged in a rear field of view. In other alternative embodiments, the imaging device 155 can include a network of wired or wirelessly connected imaging devices 155 arranged on a plurality of work vehicles, and/or located remotely at various locations throughout the worksite 170.

Although in FIG. 1, the imaging devices 155 are shown as including cameras such as stereo cameras, it should be noted that, in other embodiments, the imaging devices 155 may also include, without limitation, thermal imagers, infrared imaging devices, near infrared imaging (NIR) devices, short waved infrared (SWIR) devices, light detection and ranging devices (LIDAR), radar devices, ultrasonic devices, scanners, other suitable sensing devices, or combinations thereof. For example, as will be discussed herein, the imaging device 155 can comprise a plurality of stereo cameras that capture 2D or 3D images of the persons 127 or aerial sensing devices such as drones having one or more cameras attached thereto that capture aerial views of the worksite 170. Furthermore, NIR and SWIR cameras are not able to leverage light from the lamps that are on the machine because the lamps typically only emit visible light. Therefore, NIR and SWIR camera systems may require their own illumination sources that are coupled to the camera and pulsed synchronously with the image capture.

The electronic data processor 152 can be arranged locally as part of a vehicle electronics unit 200 (FIG. 3) or remotely at a remote processing center 222. In various embodiments, the electronic data processor 152 can comprise a microprocessor, a microcontroller, a central processing unit, a programmable logic array, a programmable logic controller, an application specific integrated circuit, a logic circuit, an arithmetic logic unit, a graphics processing unit (GPU), field programmable gate arrays (FPGAs), or other suitable programmable circuitry that is adapted to perform data processing and/or system control operations. For example, the electronic data processor 152 can process image and classification data associated with persons located in the worksite 170 and provide alerts to those persons that are not authorized is detected.

As will be appreciated by those skilled in the art, FIGS. 1 and 2 are provided for illustrative and exemplary purposes only and are in no way intended to limit the present disclosure or its applications. In other embodiments, the arrangement and/or structural configuration of pedestrian warning system 150 can vary. For example, in some embodiments, the pedestrian warning system 150 can comprise additional sensors or may be configured to monitor activity at multiple worksites or for a fleet of work vehicles.

Figure 3:
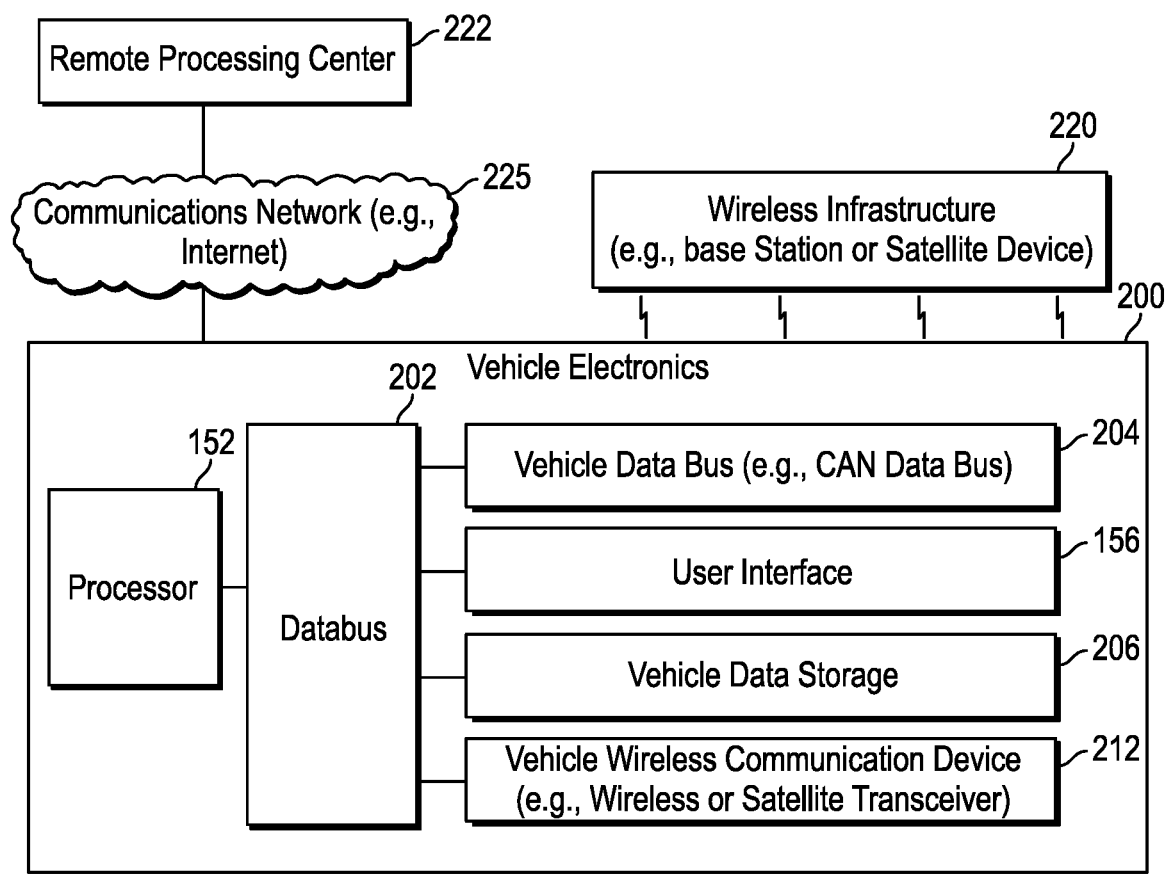
FIG. 3 is a block diagram of a vehicle electronics unit and a remote processing center according to an embodiment.

Referring now to FIG. 3, as previously discussed, the electronic data processor 152 can be arranged in the vehicle electronics unit 200 and can be configured to process images captured by the imaging device 155. For example, the electronic data processor 152 can be configured to execute a plurality of instructions stored on a vehicle data storage device 206 to identify persons, vehicles, animals, and/or other objects arranged in the images. In addition to the electronic data processor 152, the vehicle electronics unit 200 can comprise the vehicle data storage device 206, a vehicle wireless communications device 212, an operator interface (i.e., display 106), and a vehicle data bus 204 each communicatively interfaced with a main data bus 202.

As depicted, the various devices (i.e., vehicle data storage device 206, vehicle wireless communications device 212, user interface 106, and vehicle data bus 204) may communicate information, e.g., signals such as image data over the main data bus 202 to the electronic data processor 152. In other embodiments, the electronic data processor 152 can manage the transfer of data to and from a remote processing system 222 via a network 225 and wireless infrastructure 220. For example, the electronic data processor 152 can collect and process the image data from the main data bus 202 for transmission to or from the processing center 222.

The vehicle data storage device 206 stores information and data for access by the electronic data processor 152 or the vehicle data bus 204. The vehicle data storage device 206 may comprise electronic memory, nonvolatile random-access memory, an optical storage device, a magnetic storage device, or another device for storing and accessing electronic data on any recordable, rewritable, or readable electronic, optical, or magnetic storage medium. Additionally, the vehicle data storage device 206 may include one or more software modules or data structures that record, and store data collected by the imaging device 155 or other network devices coupled to or capable of communicating with the vehicle data bus 204. For example, in some embodiments, the one or more software modules and/or data structures can comprise an object identification module 207 and an alert generation module 211, and as will be discussed with reference to FIG. 4.

Figure 4:
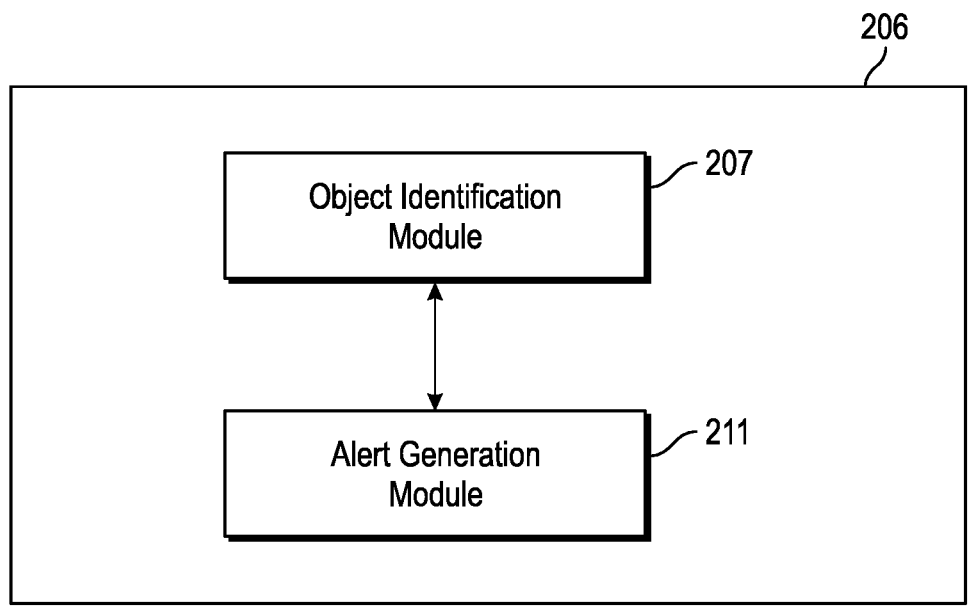
FIG. 4 is a block diagram of a vehicle data storage device according to an embodiment.

Referring now to FIG. 4, a block diagram of the vehicle data storage device 206 is shown according an embodiment. As discussed with reference to FIG. 3, the electronic data processor 152 can be configured to communicate with the vehicle data storage device 206 to access each of the modules stored therein. The vehicle data storage device 206 can comprise computer executable code that is used to implement the object identification module 207 and alert generation module 211. The term module as used herein may include a hardware and/or software system that operates to perform one or more functions. Each module can be realized in a variety of suitable configurations and should not be limited to any particular implementation exemplified herein, unless such limitations are expressly called out. Moreover, in the various embodiments described herein, each module corresponds to a defined functionality; however, it should be understood that in other embodiments, each functionality may be distributed to more than one module, or multiple defined functionalities may be implemented by a single module that performs those multiple functions.

The object identification module 207 can identify persons 127, objects 128, other vehicles (not illustrated) that may have humans inside them, and/or animals (not illustrated) located at the worksite 170. These persons 127, vehicles, and/or animals should not be on the worksite 170 and are therefore an intended target of the alert generation module 211. The object identification module 207 can identify objects 128 that may include rocks, boulders, or other ground objects that may not be intended targets of the alert generation module 211.

To identify persons 127 captured in the image by the imaging device 155, the object identification module 207 can comparatively analyze identifying characteristics 125 such as apparel, wearable devices, and/or facial recognition features with those stored in a database. For example, the object identification module 207 can analyze apparel items such as protective wear (e.g., hats or eyewear), uniforms, or color-coded protective vests, or facial recognition features such as the shape, size, and/or relative arrangement of the eyes, nose, mouth, and face to identify persons 127. In other embodiments, to identify persons 127 captured in the image by the imaging device 155, the object identification module 207 relies on other sensor technologies. For instance, machine learning techniques can be applied to radar making use of doppler information to better identify persons 127.

Additionally, a variety of wearable devices including, without limitation, headsets, speech generating devices, wearable fabrics, wrist or hand devices (e.g., smart watches), smart eyewear, Bluetooth-enabled devices, GPS tracking devices, other suitable communication devices can be used to identify the persons 127. For example, personnel such as site managers may be required to use unique headsets or speech generating devices such as handheld transceivers to communicate with and/or to alert laborers, spotters, or other personnel located offsite.

To identify animals captured in the image by the imaging device 155, the object identification module 207 can comparatively analyze identifying characteristics 125 such as shape, size, or other recognition features with those stored in a database. To identify vehicles captured in the image by the imaging device 155, the object identification module 207 can comparatively analyze identifying characteristics 125 such as shape, size, or other recognition features with those stored in a database.

The alert generation module 211 can communicate with the object identification module 207 to generate a plurality of alerts associated with the persons 127 from the object identification module 207 that are intended targets of the alert generation module 211. For example, the alert generation module 211 can generate alerts that can include, without limitation, visual alerts, audible alerts, or combinations thereof. For example, the alert generation module 211 can generate visual or audible alerts such as strobe lights or sirens, that trigger when persons 127 are detected as the intended target. The alert generation module 211 will not communicate with the object identification module 207 nor generate any alerts when an object 128 is identified.

The alert generation module 211 can generate alerts via the one or more lights 118 or the audible alert unit 160 that are directed to the persons 127, vehicle, or animal described above. The one or more lights 118 are configured to operate in one or more light spectrum ranges that does not interfere or interrupt operation of the imaging device 155 such that the images captured by the imaging device 155 are not altered by the operation of the one or more lights 118. Alternatively, or additionally, the imaging device 155 is configured to operate such as with a filter or other mechanism to block the light from the one or more lights 118 from interfering with the operation of the imaging device 155 such that the images captured by the imaging device 155 are not altered by the operation of the one or more lights 118. For example in one embodiment, the one or more lights 118 can be brake lights associated with the work vehicle 170. Alternatively, or additionally, the one or more lights 118 can include additional lights such as strobe lights, flood lights, spot lights, and/or laser lights, to name a few types of lights that can be operated in certain wavelengths that do not interfere with the imaging device 155 such that the images captured by the imaging device 155 are not altered by the operation of the one or more lights 118. As described further below, the imaging device 155 can include one or more filters that correspond to the wavelength of light that illuminates from the one or more lights 118.

Figure 5:
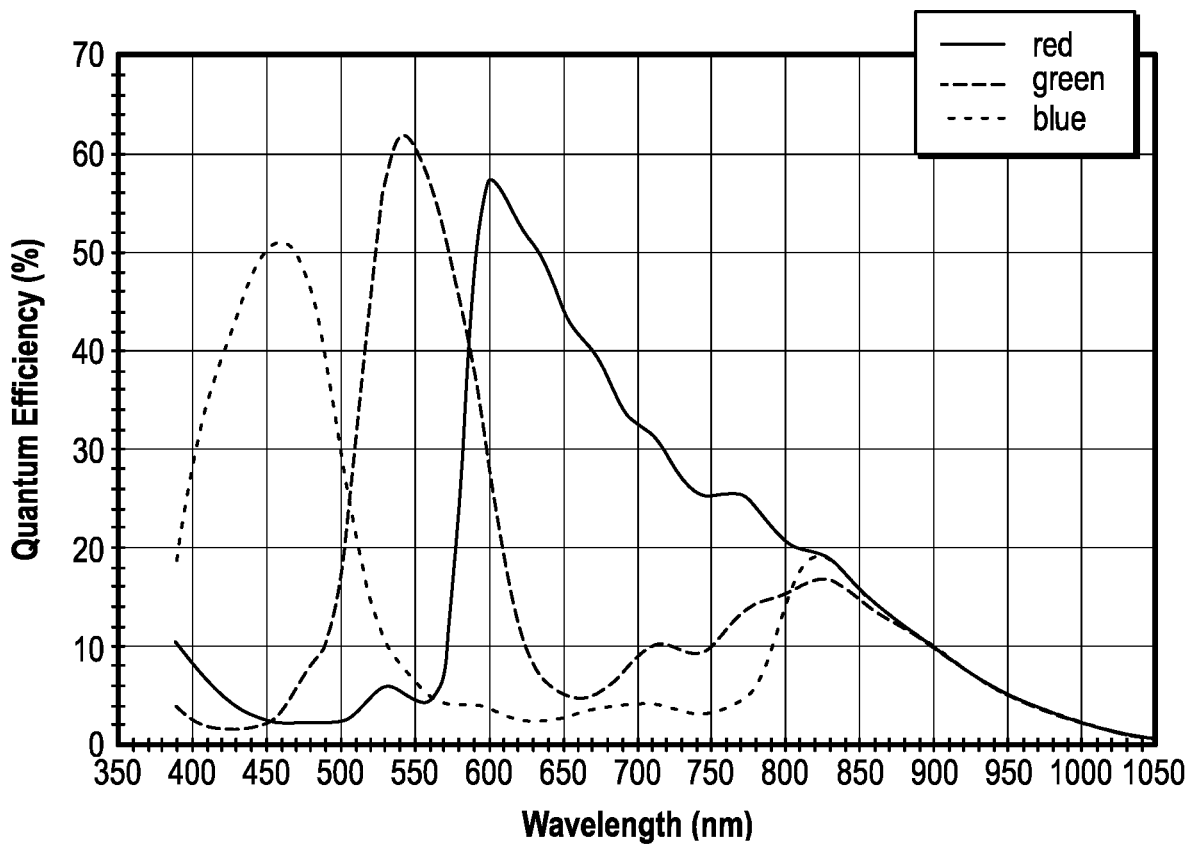
FIG. 5 illustrates a quantum efficiency chart for an imaging device of the work vehicle of FIG. 1 that illustrates red, green, and blue color channels and the corresponding wavelength (nm) of each of those colored lights that are visible to the imaging device.

FIG. 5 illustrates a quantum efficiency chart for the imaging device 155 that shows red, green, and blue color channels and the corresponding wavelength (nm) of each of those colored lights that are visible to the imaging device 155 and will be captured in images.

Figure 6:
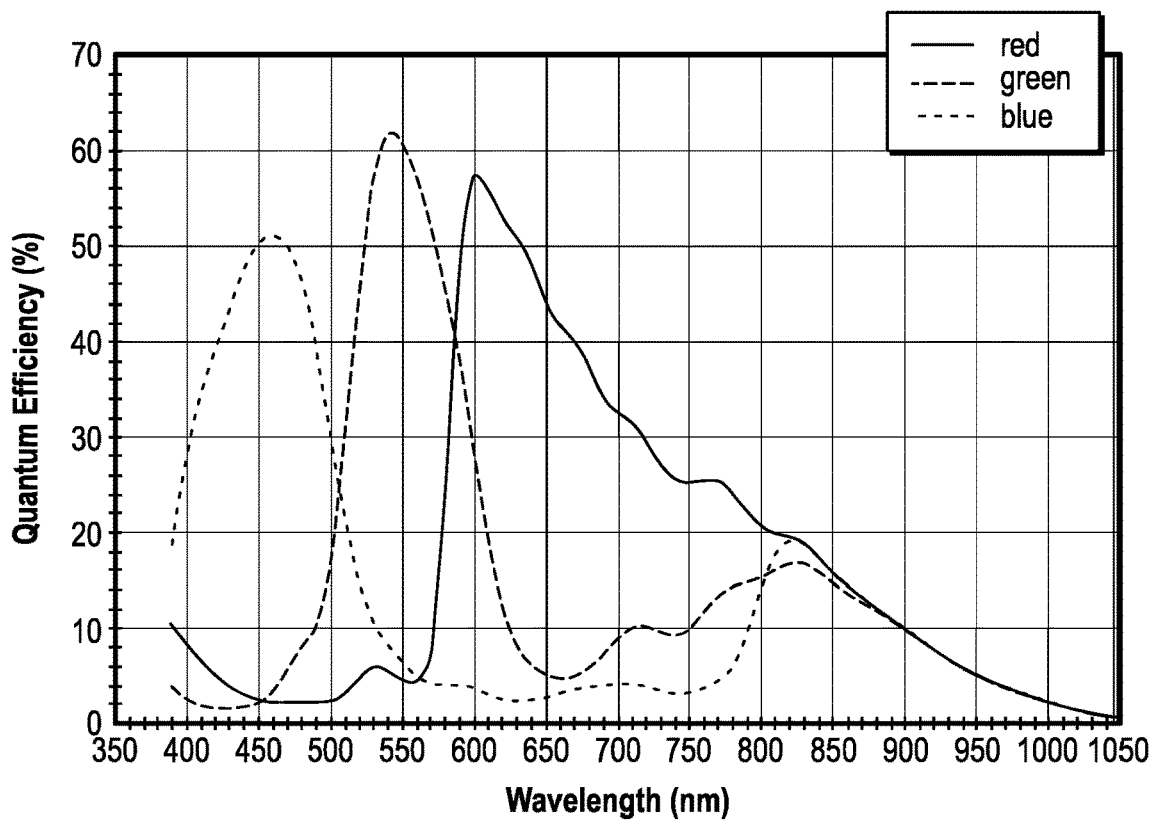
FIG. 6 illustrates wavelengths that blocked by one or more optical filters associated with the imaging device of FIG. 5.

In one embodiment, the imaging device 155 can include an optical filter that blocks light at wavelengths greater than about 650 nm as illustrated in FIG. 6. In this same embodiment, the one or more lights 118 are configured to operate at wavelengths greater than about 650 nm so that the person 127 can visually see the one or more lights 118 however operation of the imaging device 155 is not affected such that any images captured while the one or more lights 118 are operational are not affected by the one or more lights 118.

Figure 7:
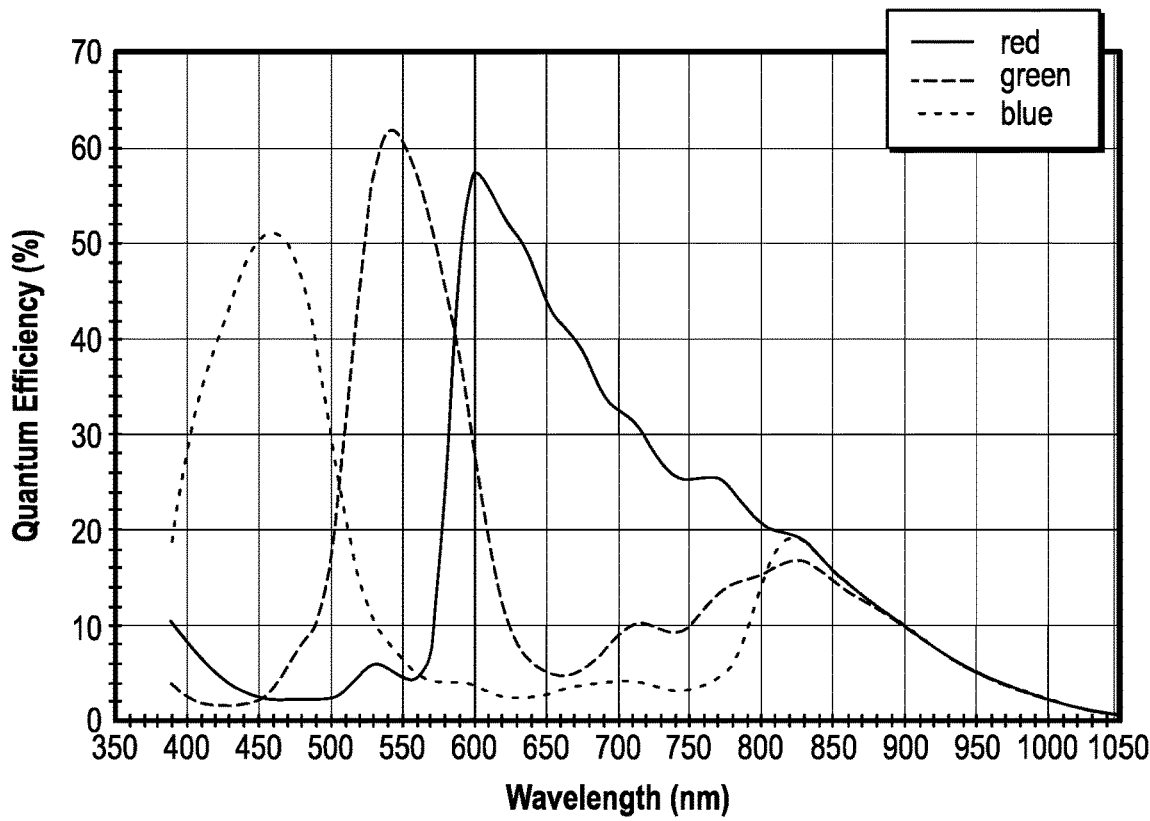
FIG. 7 illustrates wavelengths that blocked by one or more optical filters associated with the imaging device of FIG. 5.

In another embodiment, the imaging device 155 can include an optical filter that blocks light at wavelengths greater than about 600 nm or 625 nm as illustrated in FIG. 7. In this same embodiment, the one or more lights 118 are configured to operate at wavelengths greater than about 600 nm or 625 nm so that the person 127 can visually see the one or more lights 118 however operation of the imaging device 155 is not affected such that any images captured while the one or more lights 118 are operational are not affected by the one or more lights 118. By shifting the blocking filter down to about 600 nm or 625 nm may provide additional extra visible light spectrum to the person 127 to make the light easier for the person 127 to see.

Figure 8:
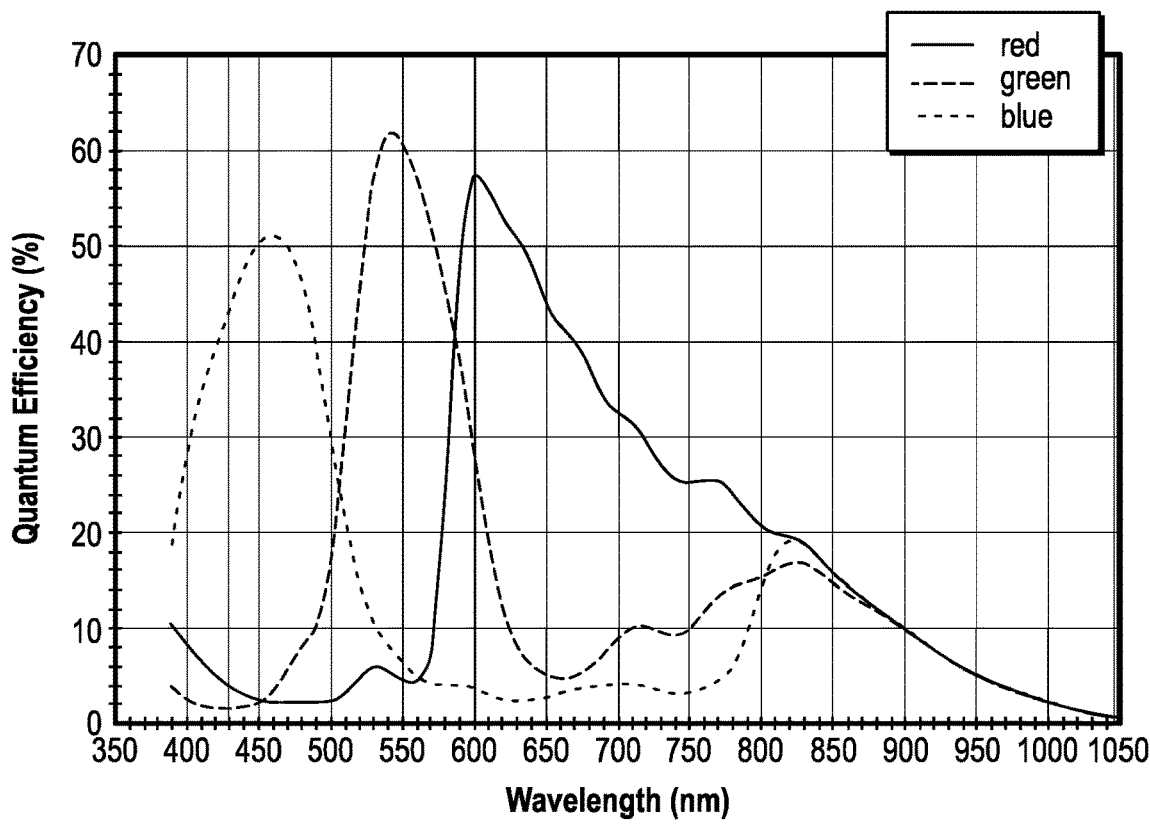
FIG. 8 illustrates wavelengths that blocked by one or more optical filters associated with the imaging device of FIG. 5.

In yet another embodiment, the imaging device 155 can include two optical filters that together block light at wavelengths greater than about 600 nm and less than 425 nm as illustrated in FIG. 8. In this same embodiment, the one or more lights 118 are configured to operate at wavelengths greater than about 600 nm so that the person 127 can visually see the one or more lights 118 that appear red however operation of the imaging device 155 is not affected such that any images captured while the one or more lights 118 are operational are not affected by the one or more lights 118. The one or more lights 118 are configured to operate at wavelengths less than about 425 nm so that the person 127 can visually see the one or more lights 118 that appear violet however operation of the imaging device 155 is not affected such that any images captured while the one or more lights 118 are operational are not affected by the one or more lights 118.

Figure 9:
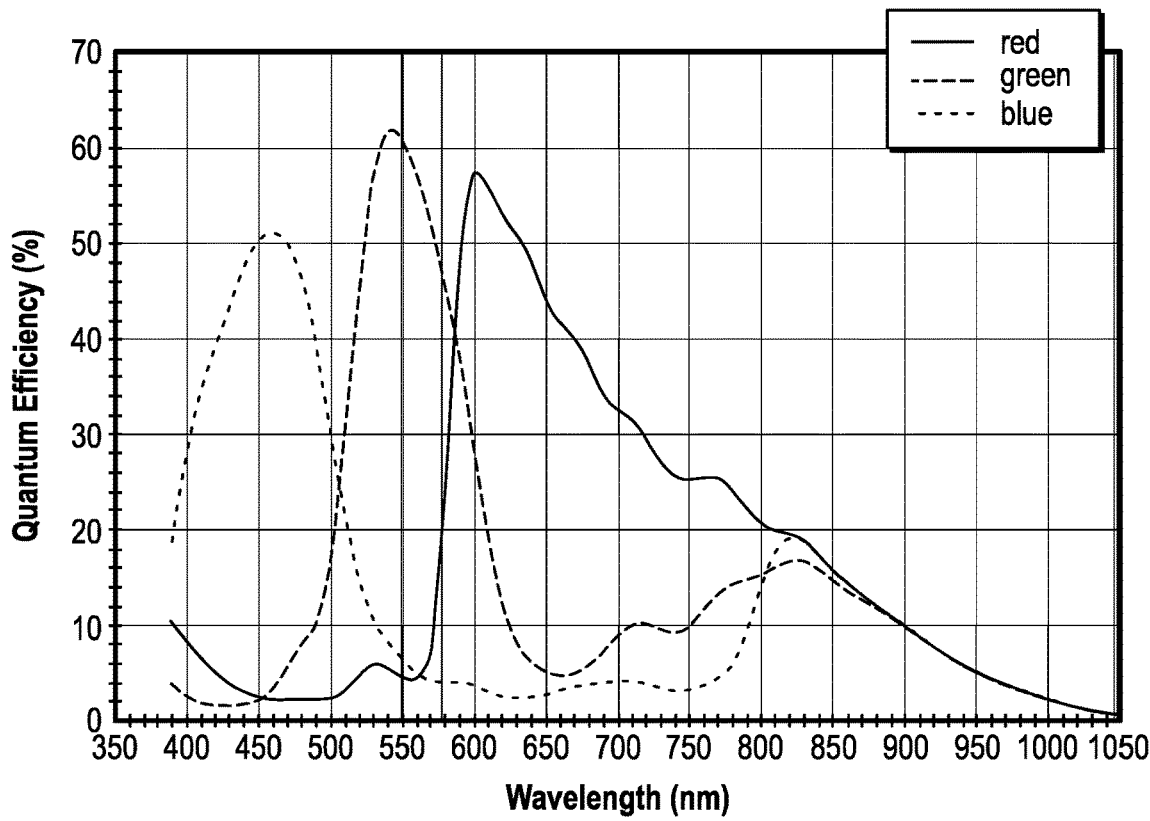
FIG. 9 illustrates wavelengths that blocked by one or more optical filters associated with the imaging device of FIGS. 5.

In yet another embodiment, the imaging device 155 can include a plurality of optical filters that together block light at wavelengths greater than about 650 nm and light between approximately 550 nm and 575 nm as illustrated in FIG. 9. In this same embodiment, the one or more lights 118 are configured to operate at wavelengths greater than about 650 nm so that the person 127 can visually see the one or more lights 118 that appear red however operation of the imaging device 155 is not affected such that any images captured while the one or more lights 118 are operational are not affected by the one or more lights 118. The one or more lights 118 can also be configured to operate at wavelengths between approximately 550 nm and 575 nm so that the person 127 can visually see the one or more lights 118 that appear green or yellow-green however operation of the imaging device 155 is not affected such that any images captured while the one or more lights 118 are operational are not affected by the one or more lights 118. In this embodiment, the one or more lights 118 are configured to operate at wavelengths greater than about 650 nm and between approximately 550 nm and 575 nm.

Operation of the one or more lights 118 towards the intended target can be done as a strobing or other intermittent operation to get the attention of the intended target as identified from the object identification module 211. It has been found that this operation of strobing or other intermittent operation of the one or more lights 118 at specific wavelengths is unique especially in situations where the intended targets have been de-sensitized to backup alarms or similar audio alarms. One issue with strobing any type of light near the imaging device 155 is that it could potentially interfere with night time performance of the imaging device 155. However, strobing the one or more lights 118 at a specific wavelength in the spectrum where the imaging device 155 is not designed to see or capture images will not interfere with the night time performance of the imaging device 155. As described above, the imaging device 155 can include an optical filter or other mechanism to filter out the wavelength in the spectrum that the one or more lights 118 are operating at. Described previously is the operating ranges of the one or more lights 118 and corresponding optical filters of the imaging device 155 to enable strobing or other intermittent operation of the one or more lights 118 to gain the attention of the intended target. These operating ranges of the one or more lights 118 will get the pedestrian or intended target's attention, while being ignored by the imaging device 155.

Operation of the audible alert unit 160 towards the intended target can be done as described previously towards the intended target as identified from the object identification module 211 to 6 get their attention. Operation of the one or more lights 118 and the audible alert unit 160 can be done together or sequentially or some combination of operation towards the intended target to get their attention.

Figure 10:
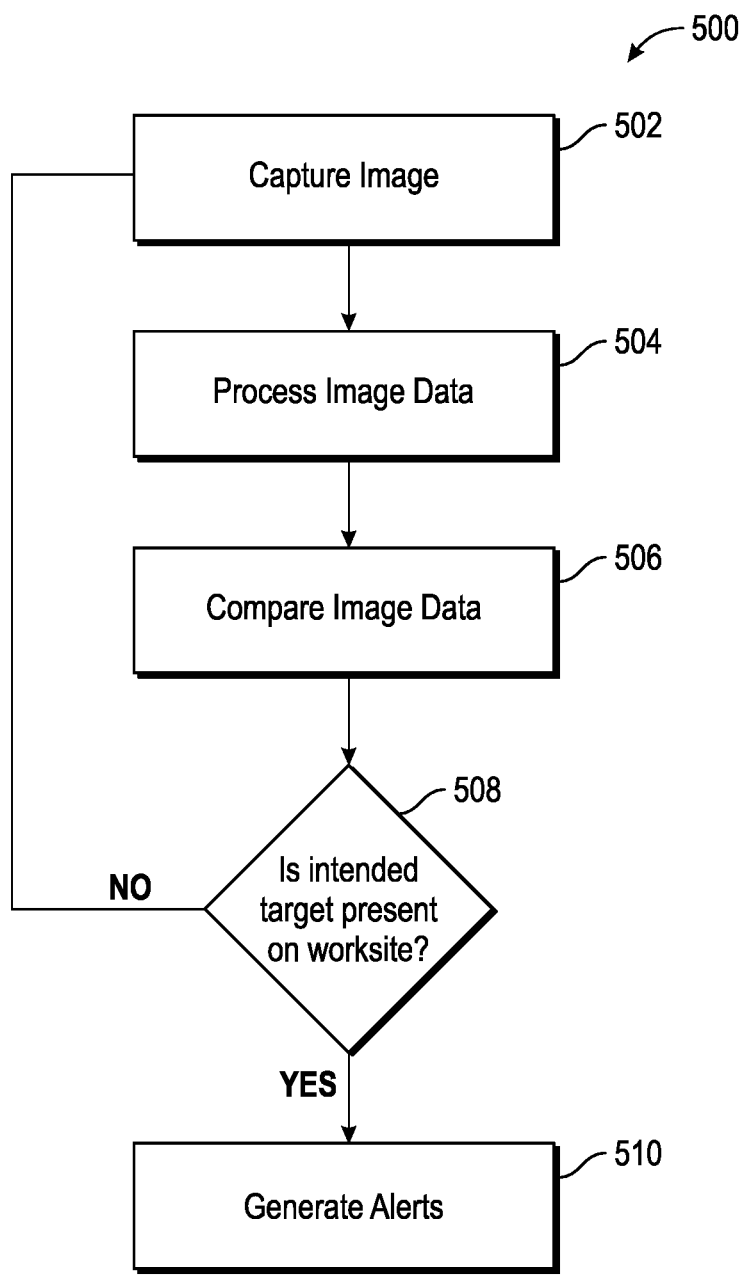
FIG. 10 is a flow diagram of a method for identifying persons located in a worksite and warning these persons.

In operation, referring now to FIG. 10, a flow diagram of a method 500 for warning one or more intended targets located in the worksite 170 is shown. At 502, the imaging device 155 can be configured to manually or automatically span a defined range within, e.g., a 90 to 180° radius to capture images of persons 127 located in the worksite 170. In one embodiment, the defined range is directed rearwardly of the vehicle 100. In another embodiment, the defined range is directed forwardly of the vehicle 100. In other embodiments, the defined range is directed to the sides of the work vehicle 100 and any of the front and rear directions of the work vehicle 100. For manual operations, an operator can input an initiation command via the user interface 156 to activate the imaging device 155. In other embodiments, such as when the system is in automatic mode, the imaging device 155 can be configured to receive an initiation bit or handshake from the electronic data processor 152 upon vehicle startup to begin capturing image data. This, in turn, also adjusts the field of view based on a detected scenery or surroundings.

Once the images are captured at 502, the image data is transmitted to the electronic data processor 152 for processing at 504. As discussed with reference to FIG. 4, each of the modules (i.e., the object identification module 207 and the alert generation module 211) can be configured to implement various functionalities and interface with one another to determine whether the persons 127 are located in the worksite 170 as intended targets, and if the persons 127 are intended targets then send an alert to the persons 127.

At 506, a comparative analysis of the captured image and stored reference data is performed by the electronic data processor 152 to identify persons 127 or objects 128 located in the image. In some embodiments, the object identification module 207 can identify other classes such as additional vehicles, animals, or other attributes, wherein these classes should not be on the worksite 170. The object identification module 207 may also utilize machine learning or other data processing techniques to fuse the image data with other sensor data for a more comprehensive perception feature set.

At 508, the electronic data processor 152 determines whether persons 127 are present on the worksite 170 and therefore are intended targets. In some embodiments, the electronic data processor 152 determines whether other classes such as additional vehicles or animals are present on the worksite 170 and therefore are intended targets. If there are no intended targets, then the method 500 continues to step 502. If there are intended targets, then the method 500 for warning persons 127 located in the worksite 170 continues to step 510.

At 510, the alert generation module 211 can communicate with the object identification module 207 to generate one or more alerts in response to intended targets detected around the work vehicle 100. For example, the alert generation module 211 can associate a first type of alert in response to persons 127 being identified as the intended target. As another example, the alert generation module 211 can associate a second type of alert in response to a vehicle being identified as the intended target. As yet another example, the alert generation module 211 can associate a third type of alert in response to animals being identified as the intended target. The first, second, or third group of alerts can include, without limitation, visual alerts, audible alerts, or combinations thereof. The first, second, or third group of alerts can each be a unique audible or visual alert for each specific class. For example, the persons 127 may receive a visual alert whereas the vehicle and/or animal may receive an audible alert. For example, in some embodiments, audible alerts can include beeps, tones, or alarms, or verbal notifications that are activated when an intended target is detected. Audible alerts can also include subtle "reminder" tones or notifications that are activated. Visual alerts such as intense strobe lights can be activated in response to a detected intended target presence.

Without in any way limiting the scope, interpretation, or application of the claims appearing below, a technical effect of one or more of the example embodiments disclosed herein is a pedestrian warning system and method. The pedestrian warning system and method are particularly advantageous in that it provides real-time monitoring of an industrial worksite by generating alerts and warnings when unauthorized persons, vehicles, and/or animals are located in around the work vehicle.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A pedestrian warning system for a work vehicle at a worksite, the pedestrian warning system comprising:
    a sensor system that captures images of an identified target located at the worksite, the sensor system operably coupled to the work vehicle;
    an electronic data processor communicatively coupled to the sensor system, the electronic data processor comprising a non-transitory computer readable storage medium having machine readable instructions that, when executed by the electronic data processor, cause the electronic data processor to:
    determine whether the identified target from the captured image is an intended target based on one or more identifying characteristics associated with the identified target;
    determine whether the identified target from the captured image is an unintended target being free of the one or more identifying characteristics associated with the intended target;
    wherein when the intended target is identified, generate an alert directed to the intended target that includes the electronic data processor generating a control signal to operate one or more lights mounted on the work vehicle, wherein the one or more lights operate in one or more light spectrum ranges that is not detected by the sensor system; and
    wherein when the unintended target is identified, the electronic data processor ceases operation of the one or more lights mounted on the work vehicle.

2. The pedestrian warning system of claim 1, wherein the sensor system comprises a plurality of imaging devices operably coupled to the work vehicle, wherein the plurality of imaging devices are configured to capture monocular or stereographic images or videos of identified targets located at the worksite.

3. The pedestrian warning system of claim 1, wherein the sensor system comprises one or more filters that block light from the light spectrum range that the one or more lights are configured to operate in.

4. The pedestrian warning system of claim 3, wherein the unintended target includes a rock.

5. The pedestrian warning system of claim 3, wherein the one or more filters block light at wavelengths greater than 600 nm, and the one or more lights operate at wavelengths greater than 600 nm.

6. The pedestrian warning system of claim 3, wherein the one or more filters block light at wavelengths greater than 600 nm and less than 425 nm, and the one or more lights operate at wavelengths greater than 600 nm and less than 425 nm.

7. The pedestrian warning system of claim 3, wherein the one or more filters block light at wavelengths greater than 650 nm and block light between 550 nm and 575 nm, and the one or more lights operate at wavelengths greater than 650 nm and block light between 550 nm and 575 nm.

8. The pedestrian warning system of claim 1, wherein the electronic data processor generates a control signal to operate the one or more lights in an intermittent operation towards the intended target.

9. The pedestrian warning system of claim 1, wherein the electronic data processor generates a control signal to operate an audible alert unit towards the intended target.

10. The pedestrian warning system of claim 1, wherein the sensor system comprises one or more of a thermal imager, a near infrared imaging device, a short waved infrared device, a light detection and ranging device, a radar device, an ultrasonic device, and/or a scanner operably coupled to the work vehicle.

11. The pedestrian warning system of claim 1, wherein the one or more identifying characteristics for the identified target being a person include apparel, wearable devices, and/or facial recognition features stored in a database accessible by the electronic data processor.

12. A method for warning an intended target on a worksite having a work vehicle thereon, the method comprising:
 capturing, via a sensor system, one or more images of an identified target located at the worksite;
 determining, via an electronic data processor communicatively coupled to the sensor system, the electronic data processor comprising a non-transitory computer readable storage medium having machine readable instructions, whether the identified target from the captured image is an intended target based on one or more identifying characteristics associated with the identified target;
 wherein when the intended target is identified, generating an alert directed to the intended target that includes the electronic data processor operating one or more lights mounted on the work vehicle in one or more light spectrum ranges that is not detected by the sensor system;
 determining, via the electronic data processor communicatively coupled to the sensor system, whether the identified target from the captured image is an unintended target being free of the one or more identifying characteristics associated with the intended target; and
 wherein when the unintended target is identified, the electronic data processor ceases operation of the one or more lights mounted on the work vehicle.

13. The method of claim 12, wherein capturing images of persons comprises capturing monocular or stereographic images or videos of persons by a plurality of imaging devices.

14. The method of claim 12, wherein generating an alert comprises activating a strobe light on the work vehicle or triggering a sound file towards the identified target to notify the identified target is located on the worksite.

15. The method of claim 12, wherein the sensor system includes one or more filters that block light from the light spectrum range that the one or more lights are configured to operate in.

16. The method of claim 15, wherein the one or more filters block light at wavelengths greater than 650 nm, and the one or more lights operate at wavelengths greater than 650 nm.

17. The method of claim 15, wherein the one or more filters block light at wavelengths greater than 600 nm, and the one or more lights operate at wavelengths greater than 600 nm.

18. The method of claim 15, wherein the one or more filters block light at wavelengths greater than 600 nm and less than 425 nm, and the one or more lights operate at wavelengths greater than 600 nm and less than 425 nm.

19. The method of claim 15, wherein the one or more filters block light at wavelengths greater than 650 nm and block light between 550 nm and 575 nm, and the one or more lights operate at wavelengths greater than 650 nm and block light between 550 nm and 575 nm.

20. The method of claim 12, further comprising:
 generating an audible alert, via an audible alert unit, towards the intended target.

* * * * *